(12) United States Patent
Bunch et al.

(10) Patent No.: US 11,278,050 B2
(45) Date of Patent: Mar. 22, 2022

(54) METHODS FOR TREATING TOBACCO AND TOBACCO-DERIVED MATERIALS TO REDUCE NITROSAMINES

(71) Applicant: R.J. Reynolds Tobacco Company, Winston Salem, NC (US)

(72) Inventors: John E Bunch, Collierville, TN (US); Robert Reinbold, Collierville, TN (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 539 days.

(21) Appl. No.: 16/165,317

(22) Filed: Oct. 19, 2018

(65) Prior Publication Data
US 2019/0116864 A1    Apr. 25, 2019

Related U.S. Application Data

(60) Provisional application No. 62/574,834, filed on Oct. 20, 2017.

(51) Int. Cl.
*A24B 15/24*    (2006.01)
*A24B 15/22*    (2006.01)
(Continued)

(52) U.S. Cl.
CPC .............. *A24B 15/245* (2013.01); *A23G 1/56* (2013.01); *A24B 15/22* (2013.01); *A24B 15/287* (2013.01); *A24D 1/045* (2013.01)

(58) Field of Classification Search
CPC ..... A24B 15/245; A24B 15/22; A24B 15/287; A23G 1/56; A24D 1/045
(Continued)

(56) References Cited

U.S. PATENT DOCUMENTS

| 1,327,692 A | 1/1920 | Beinhart |
| 1,376,586 A | 5/1921 | Schwartz |
(Continued)

FOREIGN PATENT DOCUMENTS

| CN | 102524934 | * | 7/2012 | |
| CN | 103833005 | * | 3/2014 | ............... A24D 3/10 |
(Continued)

OTHER PUBLICATIONS

Lawrence J. Henderson (1908). "Concerning the relationship between the strength of acids and their capacity to preserve neutrality". Am. J. Physiol. 21 (2): 173-179. (Year: 1908).*
(Continued)

*Primary Examiner* — Timothy Kennedy
*Assistant Examiner* — Guy F Mongelli
(74) *Attorney, Agent, or Firm* — Womble Bond Dickinson (US) LLP

(57) ABSTRACT

A method for reducing the content of nitrosamines in a tobacco material is provided herein, the method involving the steps of contacting a tobacco material with a treatment solution so as to form a treatment composition containing, in addition to the tobacco material, an acid, a complexing agent, a solvent, and, optionally, a salt, at a pH of about 5.5 or less, to obtain a tobacco material having a tobacco-specific nitrosamine content that is lower than the initial tobacco-specific nitrosamine content. The method can optionally include further processing of the tobacco material. Smoking articles and other tobacco products incorporating such treated tobacco materials are also provided.

14 Claims, 3 Drawing Sheets

(51) Int. Cl.
   *A24B 15/28* (2006.01)
   *A23G 1/56* (2006.01)
   *A24D 1/04* (2006.01)

(58) Field of Classification Search
   USPC ........................................................ 131/297
   See application file for complete search history.

(56) References Cited

U.S. PATENT DOCUMENTS

| | | | |
|---|---|---|---|
| 2,758,603 A | 8/1956 | Heljo | |
| 3,132,651 A | 5/1964 | Kiefer | |
| 3,240,214 A * | 3/1966 | Bavley | A24B 15/12 |
| | | | 131/308 |
| 3,513,857 A | 5/1970 | Silberman | |
| 3,612,065 A | 10/1971 | Rosen | |
| 3,636,097 A | 1/1972 | Harvey | |
| 3,696,917 A | 10/1972 | Levi | |
| 3,943,945 A | 3/1976 | Rosen | |
| 4,135,521 A | 1/1979 | Malan et al. | |
| 4,140,136 A | 2/1979 | Geiss et al. | |
| 4,144,895 A | 3/1979 | Fiore | |
| 4,150,677 A | 4/1979 | Osborne, Jr. et al. | |
| 4,151,848 A | 5/1979 | Newton et al. | |
| 4,267,847 A | 5/1981 | Reid | |
| 4,289,147 A | 9/1981 | Wildman et al. | |
| 4,307,733 A | 12/1981 | Teng et al. | |
| 4,308,877 A | 1/1982 | Mattina et al. | |
| 4,340,073 A | 7/1982 | De la Burde et al. | |
| 4,343,317 A | 8/1982 | Bokelman | |
| 4,347,859 A | 9/1982 | Bokelman et al. | |
| 4,351,346 A | 9/1982 | Brummer et al. | |
| 4,359,059 A | 11/1982 | Brummer et al. | |
| 4,407,307 A | 10/1983 | Gaisch et al. | |
| 4,476,881 A | 10/1984 | Gravely et al. | |
| 4,506,682 A | 3/1985 | Muller | |
| 4,513,756 A | 4/1985 | Pittman et al. | |
| 4,528,993 A | 7/1985 | Sensabaugh, Jr. et al. | |
| 4,556,073 A | 12/1985 | Gravely et al. | |
| 4,557,280 A | 12/1985 | Gravely et al. | |
| 4,566,469 A | 1/1986 | Semp et al. | |
| 4,572,219 A | 2/1986 | Gaisch et al. | |
| 4,589,428 A | 5/1986 | Keritsis | |
| 4,605,016 A | 8/1986 | Soga et al. | |
| 4,624,269 A | 11/1986 | Story et al. | |
| 4,660,577 A | 4/1987 | Sensabaugh et al. | |
| 4,709,710 A | 12/1987 | Gaisch et al. | |
| 4,716,911 A | 1/1988 | Poulose et al. | |
| 4,727,889 A | 3/1988 | Niven, Jr. et al. | |
| 4,811,745 A * | 3/1989 | Cohen | A24D 3/08 |
| | | | 131/331 |
| 4,887,618 A | 12/1989 | Bernasek et al. | |
| 4,941,484 A | 7/1990 | Clapp et al. | |
| 4,967,771 A | 11/1990 | Fagg et al. | |
| 4,986,286 A | 1/1991 | Roberts et al. | |
| 4,987,907 A | 1/1991 | Townsend | |
| 4,991,599 A | 2/1991 | Tibbetts | |
| 5,005,593 A | 4/1991 | Fagg et al. | |
| 5,015,540 A | 5/1991 | Grubbs et al. | |
| 5,060,669 A | 10/1991 | White et al. | |
| 5,065,775 A | 11/1991 | Fagg | |
| 5,074,319 A | 12/1991 | White et al. | |
| 5,092,352 A | 3/1992 | Sprinkle, III et al. | |
| 5,099,862 A | 3/1992 | White et al. | |
| 5,121,757 A | 6/1992 | White et al. | |
| 5,131,414 A | 7/1992 | Fagg | |
| 5,131,415 A | 7/1992 | Munoz et al. | |
| 5,148,819 A | 9/1992 | Fagg | |
| 5,197,494 A | 3/1993 | Kramer | |
| 5,230,354 A | 7/1993 | Smith et al. | |
| 5,234,008 A | 8/1993 | Fagg | |
| 5,243,999 A | 9/1993 | Smith | |
| 5,259,403 A | 11/1993 | Guy et al. | |
| 5,301,694 A | 4/1994 | Raymond et al. | |
| 5,318,050 A | 6/1994 | Gonzalez-Parra et al. | |
| 5,343,879 A | 9/1994 | Teague | |
| 5,360,022 A | 11/1994 | Newton | |
| 5,372,149 A | 12/1994 | Roth et al. | |
| 5,387,416 A | 2/1995 | White et al. | |
| 5,435,325 A | 7/1995 | Clapp et al. | |
| 5,445,169 A | 8/1995 | Brinkley et al. | |
| 5,539,093 A | 7/1996 | Fitzmaurice et al. | |
| 5,601,097 A | 2/1997 | De Grandpré et al. | |
| 5,668,295 A | 9/1997 | Wahab et al. | |
| 5,676,164 A | 10/1997 | Martin | |
| 5,705,624 A | 1/1998 | Fitzmaurice et al. | |
| 5,803,081 A | 9/1998 | O'Donnell, Jr. et al. | |
| 5,810,020 A | 9/1998 | Northway et al. | |
| 5,844,119 A | 12/1998 | Weigl | |
| 5,908,032 A | 6/1999 | Poindexter et al. | |
| 6,131,584 A | 10/2000 | Lauterbach | |
| 6,202,649 B1 | 3/2001 | Williams | |
| 6,298,859 B1 | 10/2001 | Kierulff et al. | |
| 6,668,839 B2 | 12/2003 | Williams | |
| 6,772,767 B2 | 3/2004 | Mua et al. | |
| 6,730,832 B1 | 5/2004 | Dominguez et al. | |
| 6,755,200 B1 | 6/2004 | Hempfling et al. | |
| 6,805,134 B2 | 10/2004 | Peele | |
| 6,834,654 B2 | 12/2004 | Williams | |
| 6,895,974 B2 | 5/2005 | Peele | |
| 6,953,040 B2 | 11/2005 | Atchley et al. | |
| 7,025,066 B2 | 4/2006 | Lawson et al. | |
| 7,032,601 B2 | 4/2006 | Atchley et al. | |
| 7,173,170 B2 | 2/2007 | Liu et al. | |
| 7,208,659 B2 | 4/2007 | Colliver et al. | |
| 7,230,160 B2 | 6/2007 | Benning et al. | |
| 7,293,564 B2 | 11/2007 | Perfetti et al. | |
| 7,337,782 B2 | 3/2008 | Thompson | |
| 7,404,406 B2 | 7/2008 | Peele | |
| 7,549,425 B2 | 6/2009 | Koga et al. | |
| 7,549,426 B2 | 6/2009 | Koga et al. | |
| 7,556,046 B2 | 7/2009 | Koga et al. | |
| 7,556,047 B2 | 7/2009 | Poindexter et al. | |
| 7,650,892 B1 | 1/2010 | Groves et al. | |
| 7,694,686 B2 | 3/2010 | Atchley et al. | |
| 7,810,507 B2 | 10/2010 | Dube et al. | |
| 7,819,124 B2 | 10/2010 | Strickland et al. | |
| 7,861,728 B2 | 1/2011 | Holton, Jr. et al. | |
| 7,901,512 B2 | 3/2011 | Quinter et al. | |
| 8,061,362 B2 | 11/2011 | Mua et al. | |
| 8,168,855 B2 | 5/2012 | Nielsen et al. | |
| 8,336,557 B2 | 12/2012 | Kumar et al. | |
| 8,353,300 B2 | 1/2013 | Li et al. | |
| 8,627,828 B2 | 1/2014 | Strickland et al. | |
| 8,940,344 B2 | 1/2015 | Crawford et al. | |
| 9,039,839 B2 | 5/2015 | Beeson et al. | |
| 9,066,538 B2 | 6/2015 | Chen et al. | |
| 9,107,453 B2 | 8/2015 | Dube et al. | |
| 9,155,334 B2 | 10/2015 | Moldoveanu et al. | |
| 9,155,772 B2 | 10/2015 | Gao et al. | |
| 9,192,193 B2 | 11/2015 | Byrd et al. | |
| 9,220,296 B2 * | 12/2015 | Fall | A24B 15/42 |
| 9,420,825 B2 | 8/2016 | Beeson et al. | |
| 9,420,826 B2 | 8/2016 | Siminszky et al. | |
| 2004/0020503 A1 | 2/2004 | Williams et al. | |
| 2004/0025891 A1 * | 2/2004 | McAdam | A24B 15/24 |
| | | | 131/297 |
| 2005/0000532 A1 * | 1/2005 | Bereman | A24B 15/246 |
| | | | 131/364 |
| 2005/0109357 A1 | 5/2005 | Williams et al. | |
| 2005/0121046 A1 | 6/2005 | Hempfling et al. | |
| 2006/0037623 A1 | 2/2006 | Lawrence, Jr. | |
| 2006/0157072 A1 * | 7/2006 | Albino | C12N 15/8243 |
| | | | 131/270 |
| 2006/0236434 A1 | 10/2006 | Conkling et al. | |
| 2007/0062549 A1 | 3/2007 | Holton, Jr. et al. | |
| 2007/0149408 A1 * | 6/2007 | Thomas | A24B 15/28 |
| | | | 504/320 |
| 2008/0029116 A1 | 2/2008 | Robinson et al. | |
| 2008/0173317 A1 | 7/2008 | Robinson et al. | |
| 2008/0196730 A1 | 8/2008 | Engstrom et al. | |
| 2008/0245377 A1 | 10/2008 | Marshall et al. | |
| 2009/0065013 A1 | 3/2009 | Essen et al. | |
| 2010/0116281 A1 | 5/2010 | Marshall et al. | |

(56) References Cited

U.S. PATENT DOCUMENTS

| | | | |
|---|---|---|---|
| 2010/0300463 A1 | 12/2010 | Chen et al. | |
| 2011/0048434 A1 | 3/2011 | Chen et al. | |
| 2011/0139164 A1 | 6/2011 | Mua et al. | |
| 2011/0173721 A1* | 7/2011 | Albino | C12N 9/00 800/286 |
| 2011/0247640 A1* | 10/2011 | Beeson | A24B 15/24 131/275 |
| 2012/0037175 A1 | 2/2012 | Cantrell et al. | |
| 2012/0055494 A1 | 3/2012 | Hunt et al. | |
| 2012/0060854 A1 | 3/2012 | Chen et al. | |
| 2012/0125354 A1 | 5/2012 | Byrd et al. | |
| 2012/0152265 A1 | 6/2012 | Dube et al. | |
| 2012/0199145 A1 | 8/2012 | Byrd et al. | |
| 2013/0269719 A1 | 10/2013 | Marshall et al. | |
| 2013/0312774 A1* | 11/2013 | Holton, Jr. | A23G 3/54 131/119 |
| 2014/0261482 A1* | 9/2014 | Fall | A24B 15/42 131/297 |
| 2015/0083143 A1* | 3/2015 | Rasouli | A24B 15/26 131/310 |
| 2016/0029689 A1 | 2/2016 | Murten et al. | |
| 2016/0331020 A1 | 11/2016 | Marshall et al. | |
| 2017/0055567 A1 | 3/2017 | de Godoy Lusso et al. | |
| 2017/0224008 A1* | 8/2017 | Uchii | A24B 13/00 |

FOREIGN PATENT DOCUMENTS

| | | | |
|---|---|---|---|
| CN | 103833005 | * | 6/2014 |
| EP | 1094724 | | 2/2001 |
| WO | WO 83/01180 | | 4/1983 |
| WO | WO 98/05226 | | 2/1998 |
| WO | WO 98/58555 | | 12/1998 |
| WO | WO 00/02464 | | 1/2000 |
| WO | WO 01/35770 | | 5/2001 |
| WO | WO 02/13636 | | 2/2002 |
| WO | WO 03/094639 | | 11/2003 |
| WO | WO 04/095959 | | 11/2004 |
| WO | WO 05/063060 | | 7/2005 |
| WO | WO 08/103935 | | 8/2008 |
| WO | WO10/132444 | | 11/2010 |
| WO | WO-2018067985 A1 * | 4/2018 | C12N 15/8225 |

OTHER PUBLICATIONS

Ind. Eng. Chem. Res. 2008, 47, 5182-5189 (Year: 2008).*
CN 103833005 WIPO Patentscope Translation (Year: 2014).*
Andersen et al., "Effect of Storage Conditions on Nitrosated, Acylated, and Oxidized Pyridine Alkaloid Derivatives in Smokeless Tobacco Products," Cancer Research, vol. 49, 1989, pp. 5895-5900.
Douglass, M. L. "The Chemistry of Nitrosamine Formation, Inhibition and Destruction" J. Soc. Cosmet. Chem., 29, 581-606 (Sep. 1978).
Durzan, D.J., Pedroso, M.C. "Nitric Oxide and Reactive Nitrogen Oxide Species in Plants," Biotechnology and Genetic Engineering Reviews, 19, 2002, 293-337.
Hildrum, K. I. et al. "Effect of Sodium Chloride Concentration on the Nitrosation of Proline at Different pH Levels" J. Agric. Food Chem., 1975, 23 (3), 439-442.
Ohta, T. et al., Classification and Determination of N-Nitroso Compounds Based on the Differences in Reactivity to Denitrosating Reagents. Chem. Pharm. Bull. 1987, 35(9), 3943-3947.
Sebranek, J.G. "Rate of Nitric Oxide Formation from Nitrite as affected by Chloride Ion Concentration", J. Muscle Foods, 1991, 2(1), 11-20.
Virk, M.S., Issenberg, P. "Nitrosation of Phenol and 2,6-Dimethoxyphenol and Its Effect on Nitrosamine Formation" J. Agric. Food Chem., 1985, 33 (6), 1082-1085.
Williams, D.L.H., Chapter 6, "Quantitative Aspects of Nitrosamine Denitrosation," in Nitrosamines and Related N-Nitroso Compounds; Loeppky, R. et al., ACS Symposium series; American Chemical Society; Washington, DC, 1994.
Adlkofer, F., "Effects of Nicotine on Biological Systems II", 1998, pp. 17-25.
Andersen, R. et al. J. Agric. Food Chem. 1989, 37, 1, 44-50.
Browne, "The Design of Cigarettes", 3rd Ed., p. 43 (1990).
Brunnemann, K. et al. Canc. Lett. 1987, 37, 7-16.
Brunnemann, K. et al. J. Toxicol.—Clin. Toxicol. 1982-1983, 19, 6&7, 661-668.
Burton, H. et al. J. Agric. Food Chem. 1992, 40, 1050-1055.
Bush et al., "Origin of Nitrite-nitrogen for Tobacco-Specific N-nitrosamine Formation" Coresta Bulletin Information 1995, Abstract, 9814.
Borgerding, M. et al. "Chemical and Biological Studies of a New Cigarette that Primarily Hearts Tobacco" Food Chem. Toxicol. 1998, vol. 36, pp. 169-182.
Chamberlain, W. et al. J. Agric. Food Chem. 1988, 36, 48-50.
Davis et al., "Tobacco Production, Chemistry and Technology", p. 346 (1999).
Deroton, C. et al. "Factors Influencing the Formation of Tobacco-Specific Nitrosamines in French Air-Cured Tobaccos in Trials and at the Farm Level" Beitrage Tabakforsch. Int. 2005, vol. 21, No. 6, pp. 305-320.
Djordjevic, M. et al. J. Agric. Food Chem. 1989, 37, 752-756.
Hecht, S. Chem. Res. Toxicol. 1998, 11, 6, 559-603.
Hecht, S. "DNA Adduct Formation from Tobacco-Specific N-nitrosamines" Mut. Res. 1999, vol. 424, 1-2, pp. 127-142.
Hoffmann, D. et al. J. Toxicol. Env. Hlth. 1997, 50, 307-364.
Müller et al. Molec. Gen. Genet. 1987, 161, 67-76.
Nestor et al. Beitrage Tabakforsch. Int., 2003, 20, 467-475.
Osterdahl, B.—-G. Food Chem. Toxic. 1990, 28, 9, 619-622).
Spiegelhalder, B. et al. Euro. J. Canc. Prev. 1996, 5, 1, 33-38.
Staaf, M. et al., "Formation of Tobacco-Specific Nitrosamines (TSNA) During Air-Curing: Conditions and Control" Beitrage Tabakforsch. Int. 2005, vol. 21, No. 6, pp. 321-330.
Tricker, A. Canc. Lett. 1998, 42, 113-118.
Wiernik, A. et al., Recent Advances in Tobacco Science, vol. 21,pp. 39-80 (1995).
Voges (Ed.) Tobacco Encyclopedia, p. 44-45 (1984).

* cited by examiner

METHODS FOR TREATING TOBACCO AND TOBACCO-DERIVED MATERIALS TO REDUCE NITROSAMINES

CROSS-REFERENCE TO RELATED APPLICATIONS

This application claims priority to U.S. Provisional Patent Application No. 62/574,834, filed Oct. 20, 2017, and which is incorporated by reference in its entirety and for all purposes.

FIELD OF THE INVENTION

The present invention relates to methods for preparing tobacco containing a reduced quantity of nitrosamines, particularly tobacco-specific nitrosamines (TSNAs). The present invention further relates to products made or derived from tobacco or that otherwise incorporate tobacco with a reduced quantity of TSNAs, and which are intended for human consumption.

BACKGROUND OF THE INVENTION

Popular smoking articles, such as cigarettes, have a substantially cylindrical rod shaped structure and include a charge, roll or column of smokable material such as shredded tobacco (e.g., in cut filler form) surrounded by a paper wrapper thereby forming a so-called "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate a filter element having multiple segments, and one of those segments can comprise activated charcoal particles. Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A cigarette is employed by a smoker by lighting one end thereof and burning the tobacco rod. The smoker then receives mainstream smoke into his/her mouth by drawing on the opposite end (e.g., the filter end) of the cigarette.

The tobacco used for cigarette manufacture is typically used in blended form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. However, for many tobacco blends, flue-cured tobacco makes up a relatively large proportion of the blend, while Oriental tobacco makes up a relatively small proportion of the blend. See, for example, *Tobacco Encyclopedia*, Voges (Ed.) p. 44-45 (1984), Browne, *The Design of Cigarettes*, 3$^{rd}$ Ed., p. 43 (1990) and *Tobacco Production, Chemistry and Technology*, Davis et al. (Eds.) p. 346 (1999).

Tobacco also may be enjoyed in a so-called "smokeless" form. Particularly popular smokeless tobacco products are employed by inserting some form of processed tobacco or tobacco-containing formulation into the mouth of the user. Various types of smokeless tobacco products are known. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; U.S. Pat. No. 7,694,686 to Atchley et al.; U.S. Pat. No. 7,810,507 to Dube et al.; U.S. Pat. No. 7,819,124 to Strickland et al.; U.S. Pat. No. 7,861,728 to Holton, Jr. et al.; U.S. Pat. No. 7,901,512 to Quinter et al.; U.S. Pat. No. 8,168,855 to Nielsen et al.; U.S. Pat. No. 8,336,557 to Kumar et al.; U.S. Pat. No. 8,627,828 to Strickland et al.; U.S. Pat. No. 8,940,344 to Crawford et al.; U.S. Pat. No. 9,155,772 to Gao et al.; US Pat. Pub. Nos. 2004/0020503 to Williams; 2007/0062549 to Holton, Jr. et al.; 2008/0029116 to Robinson et al.; 2008/0173317 to Robinson et al.; 2008/0196730 to Engstrom et al.; 2009/0065013 to Essen et al.; and 2011/0139164 to Mua et al.; PCT WO 2004/095959 to Arnarp et al. and WO 2010/132444 to Atchley; each of which is incorporated herein by reference.

Smokeless tobacco products are available in various forms, including, but not limited to, moist snuff, dry snuff, snus, chewing tobacco, plug tobacco, twist tobacco, and dissolvables. Representative types of moist snuff products and "snus" products have been manufactured in Europe, particularly in Sweden, by or through companies such as Swedish Match AB, Fiedler & Lundgren AB, Gustavus AB, Skandinavisk Tobakskompagni A/S, and Rocker Production AB. Snus products available in the U.S.A. have been marketed under the tradenames Camel Snus Frost, Camel Snus Original and Camel Snus Spice by R. J. Reynolds Tobacco Company. See also, for example, Bryzgalov et al., 1N1800 Life Cycle Assessment, Comparative Life Cycle Assessment of General Loose and Portion Snus (2005). In addition, certain quality standards associated with snus manufacture have been assembled as a so-called GothiaTek standard.

Representative smokeless tobacco products also have been marketed under the tradenames Oliver Twist by House of Oliver Twist A/S; Copenhagen, Skoal, SkoalDry, Rooster, Red Seal, Husky, and Revel by U.S. Smokeless Tobacco Co.; "taboka" by Philip Morris USA; Levi Garrett, Peachy, Taylor's Pride, Kodiak, Hawken Wintergreen, Grizzly, Dental, Kentucky King, and Mammoth Cave by Conwood Company, LLC; and Camel Orbs, Camel Sticks, and Camel Strips by R. J. Reynolds Tobacco Company.

Through the years, various treatment methods and additives have been proposed for altering the overall character or nature of tobacco materials utilized in tobacco products. For example, additives or treatment processes have been utilized in order to alter the chemistry or sensory properties of the tobacco material, or in the case of smokable tobacco materials, to alter the chemistry or sensory properties of mainstream smoke generated by smoking articles including the tobacco material. Various types of enzymes, bacteria, and microorganisms (e.g., fungi and yeast) have been employed in conjunction with tobacco for the purpose of altering the chemical makeup of the tobacco, e.g., by reducing the content of certain chemical compounds. See, for example, U.S. Pat. No. 3,132,651 to Keifer; U.S. Pat. No. 3,513,857 to Silberman; U.S. Pat. No. 3,240,214 to Bayley; U.S. Pat. No. 3,636,097 to Harvey; U.S. Pat. No. 3,612,065 to Rosen; U.S. Pat. No. 3,943,945 to Rosen; U.S. Pat. No. 4,135,521 to Malan; U.S. Pat. No. 4,140,136 to Geiss et al.; U.S. Pat.

No. 4,151,848 to Newton et al.; U.S. Pat. No. 4,307,733 to Teng; U.S. Pat. No. 4,308,877 to Mattina et al.; U.S. Pat. No. 4,407,307 to Gaisch; U.S. Pat. No. 4,476,881 to Gravely et al.; U.S. Pat. No. 4,556,073 to Gravely et al.; U.S. Pat. No. 4,557,280 to Gravely et al.; U.S. Pat. No. 4,566,469 to Semp et al.; U.S. Pat. No. 4,572,219 to Gaisch; U.S. Pat. No. 4,709,710 to Gaisch; U.S. Pat. No. 4,716,911 to Poulose; U.S. Pat. No. 4,887,618 to Bernasek; U.S. Pat. No. 4,941,484 to Clapp; U.S. Pat. No. 5,099,862 to White; U.S. Pat. No. 5,343,879 to Teague; U.S. Pat. No. 5,372,149 to Roth et al.; U.S. Pat. No. 5,601,097 to DeGranpreet; U.S. Pat. No. 7,549,425 to Koga et al.; U.S. Pat. No. 7,549,426 to Koga et al.; and U.S. Pat. No. 7,556,046 to Koga et al.; Int. Appl. Publ. No. WO 2000/02464 to Kierulff; and EP Appl. No. 1094724 to Kierulff, which are all incorporated herein by reference.

Nitrosamines are known to be present in air, foods, beverages, cosmetics, and even pharmaceuticals. Preussman, R. et al., In *Chemical Carcinogens*, 2nd ed., Vol. 2, Searle, C. E. (Ed.); ACS Monograph 182; 1984; pp 829-868. Tobacco and tobacco smoke also are known to contain nitrosamines. Green et al. *Rec. Adv. Tob. Sci.* 1996, 22, 131. Tobacco is known to contain a class of nitrosamines known as tobacco-specific nitrosamines (TSNAs). Hecht, S. *Chem. Res. Toxicol.* 1998, 11, 6, 559-603; Hecht, S. *Mut. Res.* 1999, 424, 1-2, 127-142. TSNAs have been reported to be present in smokeless tobacco (see, e.g., Brunnemann, K. et al. *Canc. Lett.* 1987, 37, 7-16, Tricker, A. *Canc. Lett.* 1988, 42, 113-118, Andersen, R. et al. *Canc. Res.* 1989, 49, 5895-5900); cigarette smoke (see, e.g., Spiegelhalder, B. et al. *Euro. J. Canc. Prev.* 1996, 5, 1, 33-38; Hoffmann, D. et al. *J. Toxicol. Env. Hlth.* 1997, 50, 307-364; Borgerding, M. et al. *Food Chem. Toxicol.* 1998, 36, 169-182); nicotine-containing gum (see, e.g., Osterdahl, B.-G. *Food Chem. Toxic.* 1990, 28, 9, 619-622); and a nicotine-containing transdermal patch (see, e.g., Adlkofer, F. In *Effects of Nicotine on Biological Systems II*, Clarke, P. et al. (Eds.); 1998, pp 17-25). Exemplary TSNAs are N-nitrosonornicotine (NNN), 4-methyl-N-nitrosamino-1-(3-pyridyl)-1-butanone (NNK), N-nitrosoanatabine (NAT), 4-methyl-N-nitrosamino-1-(3-pyridyl)-1-butanol (NNAL), and N-nitrosoanabasine (NAB). The two TSNAs of greatest concern are N'-nitrosonornicotine (NNN) and 4-(N-nitrosomethylamino)-1-(3-pyridyl)-1-butanone (NNK). Of these two, NNK is of the greatest concern.

Green and freshly harvested tobaccos have been reported to be virtually free of TSNAs. Parsons, A. *Tob. Sci.* 1986, 30, 81-82; Spiegelhalder, B. et al. *Euro. J. Canc. Prev.* 1996, 5, 1, 33-38; Brunnemann, K. et al. *J. Toxicol.-Clin. Toxicol.* 1982-3, 19, 6&7, 661-668; Andersen, R. et al. *J. Agric. Food Chem.* 1989, 37, 1, 44-50; Djordjevic, M. et al. *J. Agric. Food Chem.* 1989, 37, 752-756. However, it has been observed that TSNAs form during the post-harvest processing to which tobacco is subjected. Tricker, A. *Canc. Lett.* 1998, 42, 113-118; Chamberlain, W. et al. *J. Agric. Food Chem.* 1988, 36, 48-50. TSNAs are recognized as being formed when tobacco alkaloids, such as nicotine and nornicotine, are nitrosated. Hecht, S. *Chem. Res. Toxicol.* 1998, 11, 6, 559-603. This nitrosation may occur during the processing and storage of tobacco, and by combustion of tobacco containing nicotine and nornicotine in a nitrate-rich environment.

Significant efforts have been expended towards studying the mechanism of TSNA formation during tobacco curing. For example, it has been postulated that TSNAs form during the air-curing of Burley tobacco as a result of microbial mediated conversion of nitrate to nitrite. Once the conversion to nitrite is effected, numerous reactive nitrogen/oxygen compounds can be produced in a cascade of chemical conversions of nitrous acid to dinitrogen trioxide, dinitrogen tetroxide and nitric oxide, for example. TSNAs are formed by the subsequent reaction of these nitrate-derived chemical species with alkaloids present in the tobacco. Hamilton et al. *Tob. Sci.* 26, 133-137 (1982); Burton, H. et al. *J. Agric. Food Chem.* 1992, 40, 1050-1055; Bush et al., *Coresta Bulletin Information* 1995, Abstract, 9814; Wiernik, A. et al. *Rec. Adv. Tob. Sci.* 21, 39-80 (1995); Cui et al., TCRC (1996); deRoton, C. et al. *Beitrage Tabakforsch. Int.* 2005, 21, 6, 305-320; and Staaf, M. et al., *Beitrage Tabakforsch. Int.* 2005, 21, 6, 321-330. Specifically, bacteria (e.g., gram negative bacteria) can produce the enzyme nitrate reductase, which converts nitrates to nitrite and nitric oxide; nitric oxide can subsequently react with precursor tobacco alkaloids to produce TSNAs. Additionally, for example, it has been postulated that TSNAs form during the flue-curing of Virginia tobaccos due to interaction of those tobaccos with nitric oxide combustion products present in exhaust gases produced during use of so-called direct-fired flue-curing barns. U.S. Pat. No. 7,404,406 to Peele; Nestor et al. *Beitrage Tabakforsch. Int.* 2003, 20, 467-475; see also U.S. Pat. No. 7,650,892 to Groves et al.

TSNAs are classified as electrophilic alkylating agents, and it is therefore desirable to minimize their presence in tobacco products. Consequently, various efforts to reduce TSNA levels by modifying the growth or curing process have been attempted. See, for example, U.S. Pat. Nos. 4,343,317 and 4,347,859 to Bokelman; U.S. Pat. No. 5,803,081 to O'Donnell; U.S. Pat. No. 6,202,649 to Williams; U.S. Pat. No. 6,805,134 to Peele; U.S. Pat. No. 7,293,564 to Perfetti et al.; U.S. Pat. No. 7,404,406 to Peele; U.S. Pat. No. 8,353,300 to Li et al.; U.S. Pat. No. 9,066,538 to Chen et al.; U.S. Pat. No. 9,155,334 to Moldoveanu et al.; US Pat. Pub. Nos. 2016/0331020 and US2013/0269719 to Marshall et al., PCT Appl. Publ. Nos. WO 83/01180 to Malik; WO 98/05226 and WO 98/58555 to Williams; WO 01/35770 and WO 02/13636 to Hempfling et al., and WO 03/094639 to Koga et al., and Müller et al. *Molec. Gen. Genet.* 1987, 161, 67-76, which are all incorporated herein by reference.

Efforts to reduce or remove TSNAs from tobacco products by extraction methods, trapping methods, pH manipulations, or various combinations of these methods have also been reported. See, for example, US Pat. Appl. Publ. No. 2016/0029689 to Lang et al.; U.S. Pat. No. 9,420,826 to Siminszky et al.; U.S. Pat. No. 9,192,193 to Byrd et al.; and U.S. Pat. No. 9,420,825 to Beeson et al. Further, U.S. Pat. No. 5,810,020 to Northway et al. describes a process for denitrifying and denitrosating tobacco materials in a two-stage wash procedure. Cured tobacco is washed with a crown ether-organic solvent-aqueous mixture to remove nitrates and nitrites, followed by TSNAs removal from the denitrified tobacco by contacting the tobacco material with a trapping sink, wherein the trapping sink comprises a select transition metal complex and a free radical interceptor.

Despite such efforts to remove TSNAs from tobacco, it would be useful to provide alternative methods for the removal of at least a portion of the TSNAs in tobacco. Further, it would be desirable to provide tobacco compositions and formulations exhibiting decreased TSNA content for inclusion within smoking articles or smokeless tobacco products.

SUMMARY OF THE INVENTION

The present invention provides a method of treating tobacco, a tobacco-derived material or a tobacco product to reduce the nitrosamine content thereof. Particularly, the invention provides tobacco, tobacco-derived materials, and tobacco products having reduced levels of TSNAs. The invention further provides products incorporating such tobacco materials, which are intended for human consumption.

In one aspect, the invention provides a method for reducing the content of nitrosamines in tobacco, said method comprising contacting a tobacco material having an initial tobacco-specific nitrosamine content with a treatment solution to obtain a treatment composition. The treatment composition comprises, in addition to the tobacco material, an acid, a complexing agent, and a solvent. The pH of the treatment composition is about 5.5 or less. A treated tobacco material is thus provided having a tobacco-specific nitrosamine content that is lower than the initial tobacco-specific nitrosamine content.

In some embodiments, the solvent is water. In some embodiments, the treatment composition comprises from about 10% to about 70% water by weight, about 20% to about 60% by weight, or about 30% to about 55% by weight. In some embodiments, the pH of the treatment composition is from about 5.5 to about 3.0.

In some embodiments, the complexing agent is natively present in the tobacco material as a chelate, such that no exogenous complexing agent is added. In other embodiments, the complexing agent is zinc chloride. In some embodiments, the zinc chloride is present in the treatment composition at a concentration of from about 1% to about 6.5% by weight on a dry weight basis. In some embodiments, the zinc chloride is present in the treated tobacco material at a concentration of less than about 2.5% by weight on a dry weight basis.

In some embodiments, the treatment composition further comprises a salt. In some embodiments, the salt is a halide of a Group I or II metal. In some embodiments, the salt is selected from the group consisting of sodium chloride, sodium bromide, sodium iodide, potassium chloride, potassium bromide, potassium iodide, calcium chloride, calcium bromide, magnesium chloride magnesium bromide, ammonium chloride, and combinations thereof. In some embodiments, the salt is present in the treatment composition at a concentration of from about 1% to about 8% by weight on a dry weight basis.

In some embodiments, the acid is selected from the group consisting of hydrochloric acid, sulfuric acid, phosphoric acid, acetic acid, and combinations thereof. In a preferred embodiment, the acid is hydrochloric acid.

In some embodiments, the initial tobacco-specific nitrosamine content of one or more of NNN, NAT, NAB, NNK, or total TSNA is from about 1 ppm to about 100 ppm on a dry basis. In some embodiments, the tobacco-specific nitrosamine content of one or more of NNN, NAT, NAB, NNK, or total TSNA in the treated tobacco material is less than about 5 ppm on a dry basis. In some embodiments, the method of treating tobacco provides a reduction in one or more of NNN, NAT, NAB, NNK, or total TSNA content of from about 2% to about 99%. In some embodiments, the method further comprises subjecting the treatment composition to microwave irradiation.

In another aspect is provided a tobacco material having a reduced TSNA content produced by contacting a tobacco material having an initial tobacco-specific nitrosamine content with a treatment solution to obtain a treatment composition, wherein the treatment composition comprises, in addition to the tobacco material, an acid, a complexing agent, and a solvent. The pH of the treatment composition is about 5.5 or less. The method provides a treated tobacco material having a tobacco-specific nitrosamine content that is lower than the initial tobacco-specific nitrosamine content.

In another aspect is provided a process for the preparation of a tobacco material having a reduced TSNA content, the process comprising the steps of: a) providing a tobacco material containing an initial tobacco-specific nitrosamine content; b) providing a treatment solution comprising at least an acid and a solvent; c) contacting the tobacco material with the treatment solution to provide a treatment composition comprising the tobacco material, the acid, a complexing agent, and the solvent; d) optionally, subjecting the treatment composition to microwave irradiation or thermal heating; and, e) providing a treated tobacco material with a tobacco-specific nitrosamine content which is reduced relative to the initial tobacco-specific nitrosamine content.

The invention includes, without limitation, the following embodiments.

Embodiment 1

A method for reducing the content of nitrosamines in tobacco, said method comprising contacting a tobacco material having an initial tobacco-specific nitrosamine content with a treatment solution to obtain a treatment composition; wherein the treatment composition comprises, in addition to the tobacco material, an acid, a complexing agent, and a solvent; and wherein the pH of the treatment composition is about 5.5 or less; to provide a treated tobacco material having a tobacco-specific nitrosamine content that is lower than the initial tobacco-specific nitrosamine content.

Embodiment 2

The method of the preceding embodiment, wherein the solvent is water.

Embodiment 3

The method of any preceding embodiment, wherein the treatment composition comprises from about 10% to about 70% water by weight.

Embodiment 4

The method of any preceding embodiment, wherein the treatment composition comprises from about 20% to about 60% water by weight.

Embodiment 5

The method of any preceding embodiment, wherein the treatment composition comprises from about 30% to about 55% water by weight.

Embodiment 6

The method of any preceding embodiment, wherein the pH of the treatment composition is from about 5.5 to about 3.0.

Embodiment 7

The method of any preceding embodiment, wherein the complexing agent is natively present in the tobacco material as a chelate, such that no exogenous complexing agent is added.

Embodiment 8

The method of any preceding embodiment, wherein the complexing agent is zinc chloride.

Embodiment 9

The method of any preceding embodiment, wherein the zinc chloride is present in the treatment composition at a concentration of from about 1% to about 6.5% by weight on a dry weight basis.

Embodiment 10

The method of any preceding embodiment, wherein the zinc chloride is present in the treated tobacco material at a concentration of less than about 2.5% by weight on a dry weight basis.

Embodiment 11

The method of any preceding embodiment, wherein the treatment composition further comprises a salt.

Embodiment 12

The method of any preceding embodiment, wherein the salt is a halide of a Group I or II metal.

Embodiment 13

The method of any preceding embodiment, wherein the salt is selected from the group consisting of sodium chloride, sodium bromide, sodium iodide, potassium chloride, potassium bromide, potassium iodide, calcium chloride, calcium bromide, magnesium chloride magnesium bromide, ammonium chloride, and combinations thereof.

Embodiment 14

The method of any preceding embodiment, wherein the salt is present in the treatment composition at a concentration of from about 1% to about 8% by weight on a dry weight basis

Embodiment 15

The method of any preceding embodiment, wherein the acid is selected from the group consisting of hydrochloric acid, sulfuric acid, phosphoric acid, acetic acid, and combinations thereof.

Embodiment 16

The method of any preceding embodiment, wherein the acid is hydrochloric acid.

Embodiment 17

The method of any preceding embodiment, wherein the initial tobacco-specific nitrosamine content of one or more of NNN, NAT, NAB, NNK, or total TSNA is from about 1 ppm to about 100 ppm on a dry basis.

Embodiment 18

The method of any preceding embodiment, wherein the treated tobacco material tobacco-specific nitrosamine content of one or more of NNN, NAT, NAB, NNK, or total TSNA is less than about 5 ppm on a dry basis.

Embodiment 19

The method of any preceding embodiment, wherein said method provides a reduction in one or more of NNN, NAT, NAB, NNK, or total TSNA content of from about 2% to about 99%.

Embodiment 20

The method of any preceding embodiment, further comprising subjecting the treatment composition to microwave irradiation.

Embodiment 21

A tobacco material having a reduced TSNA content produced by the method of any preceding embodiment.

Embodiment 22

A process for the preparation of a tobacco material having a reduced TSNA content, the process comprising the steps of:
  a) providing a tobacco material containing an initial tobacco-specific nitrosamine content;
  b) providing a treatment solution comprising at least an acid and a solvent;
  c) contacting the tobacco material with the treatment solution to provide a treatment composition comprising the tobacco material, the acid, a complexing agent, and the solvent;
  d) optionally, subjecting the treatment composition to microwave irradiation or thermal heating; and
  e) providing a treated tobacco material with a tobacco-specific nitrosamine content which is reduced relative to the initial tobacco-specific nitrosamine content.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE INVENTION

Figure 1:
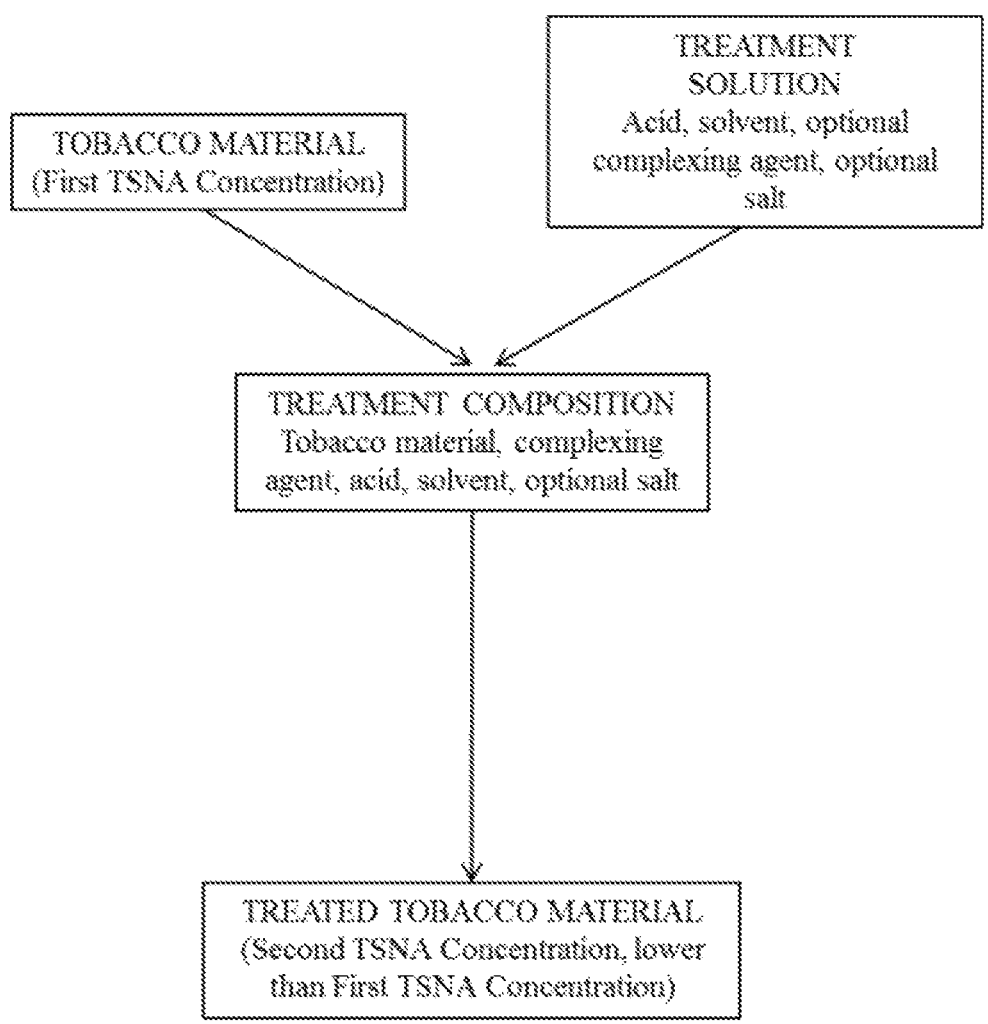
FIG. 1 is a schematic representation of the disclosed treatment method for reducing nitrosamines such as tobacco-specific nitrosamines (TSNAs)

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (et al, all ingredients except water).

According to the present disclosure, a method for modifying the nitrosamine content of a tobacco material is provided. Specifically, methods are provided to reduce the tobacco-specific nitrosamine (TSNA) content of a tobacco, a tobacco-derived material or a tobacco product. Reduction of such content is performed by treating tobacco materials with a composition (referred to herein as a "treatment solution"), which irreversibly removes the nitrosyl group (denitrosation) from the TSNAs present therein. The denitrosation of nitrosamines according to the present disclosure occurs under acidic conditions at a pH near the pKa of the TSNA, and, although not intending to be limited by theory, is believed to proceed by the mechanism proposed below in Equations 1 and 2. See, for example, Williams, in *Nitrosamines and Related N-Nitroso Compounds*; Loeppky et al, 1994 ACS Symposium Series, American Chemical Society, Washington, D.C.; Williams, *Adv. Phys. Org. Chem.* 1983, 19, 408, Ed's. V. Gold and D. Bethell, Academic Press, and Douglass et al., *J. Soc. Cosm. Chem.* 29, 581-606 (1978), each of which are incorporated by reference herein. It is postulated that an initial rapid, reversible protonation of a nitrosamine by an acid component (H⁺) is followed by a rate-determining nucleophilic attack by a nucleophilic species (Y⁻) to produce a protonated amine and a nitrosyl species. The reversible nature of the reaction allows for recombination of the nitrosyl species to reform the nitrosamine.

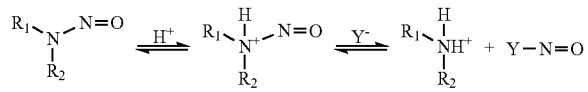

(EQUATION 1)

In the presence of sufficient quantities of a trap (X) for the nitrosyl or any other reactive nitrogen species formed or present, the reversible reaction equilibrium is shifted to the right by permanently removing at least a portion of the nitrosyl species formed in Equation 1 (Equation 2). The removal of the nitrosyl species by this subsequent reaction thereby provides the denitrosated amine in an irreversible manner.

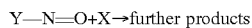→further products (EQUATION 2)

Surprisingly, according to the present disclosure, it has been found that the presence of certain complexing agents, in the form of particular metal ions, facilitate the denitrosation reaction of TSNAs in tobacco materials. In certain embodiments, any one or more of the concentration of the acid component, the concentration of an optional added salt, and the quantity of solvent present can influence the rate and extent of the denitrosation reaction of TSNAs in tobacco materials.

In the present invention, the trap X may be a molecule (or portion thereof) natively present in the tobacco material (e.g., other amines, alkenes, ketones, phenols or other species reactive toward the nitrosyl group) or can be added to the tobacco material. In some embodiments, X is an added salt. The optional added salt of the treatment solution is generally a salt that is different from the complexing agent (in embodiments wherein the complexing agent is a metal salt). Without wishing to be bound by theory, the added salt may function as a trap or "sink," may act as a source of nucleophilic ions (Y⁻) which cleave the nitrosyl group from the nitrosamine molecule (Equation 1), and/or may also provide a means to increase the ionic strength of the treatment composition and alter the rate of reaction. Consequently, when the treatment solution is added to tobacco material, the hydration of the tobacco material is increased by the acidic pH of the composition and also may be altered by the increased ionic character contributed by the presence of any added salt. Without wishing to be bound by theory, it is believed that the added salt, in some instances, may also inhibit recombination of the nitrosyl group or other nitrosating species generated within the treatment composition with the amine generated from denitrosation, thereby suppressing the undesired reverse reaction (see, e.g., Hildrum et al., *J. Agric. Food Chem.*, 23(3), 1975, 439-442).

Therefore, the added salt can be any salt capable of providing nucleophilic ions and increasing the ionic strength of the treatment composition. Exemplary added salts include, but are not limited to, halide salts of metals. Halides include, for example, chloride, bromide, and iodide. Exemplary metals include, but are not limited to, Group I or Group II metals (e.g., sodium, potassium, calcium, or magnesium). In one embodiment, the added salt is an ammonium salt, such as ammonium chloride. Preferably, the added salt has a high solubility in the solvent of the treatment solution, for example, at least about 100 grams per liter. The amount of added salt present within the treatment composition can vary and is generally that amount sufficient to facilitate denitrosation and/or prevent reformation of TSNAs. In some embodiments, the added salt is absent. In some embodiments, the added salt is present within the treatment composition in catalytic amounts (i.e., less than stoichiometric quantities relative to the nitrosamine molecules to be denitrosated). In some embodiments, the added salt is present within the treatment composition in a concentration of about 0.5% to about 20% by dry weight, about 0.5% to about 10% by dry weight, or about 1% to about 5% by dry weight of the treatment composition. In some embodiments, the added salt is present at about 3% dry weight of the treatment composition. In some embodiments, the amount of salt added is not only selected based on the desired chemical effect within the treatment composition, but is further selected based on the desired salt content in the treated tobacco material. For example, high salt content may not be desirable in the final product and, while greater amounts of salt may promote the desired reactions referenced above, the salt content in the treatment composition may advantageously be kept below a particular threshold to avoid the presence of high levels of salt in the treated tobacco material (e.g., about 8% by dry weight or less, about 7% by dry weight or less, about 6% by dry weight or less, or about 5% by dry weight or less). In some embodiments, the added salt is present at from about 1% to about 8% by weight based on the dry weight of the treatment composition Specifically, the present disclosure provides a method for reducing the TSNA content of a tobacco material through denitrosation by contacting a tobacco material having a first TSNA concentration with a treatment solution to give a treatment composition comprising a complexing agent, an acid, a solvent, and, optionally, an added salt, as illustrated in FIG. 1, providing a treated tobacco material therefrom, the treated tobacco material having a second TSNA concentration that is lower than the first TSNA concentration. Although the disclosure focuses on treatment solutions comprising these noted components (complexing agent, acid, solvent, and optionally, an added salt), in some embodiments, one or more of these components is already present in sufficient amounts within the tobacco material to be treated. As such, in some embodiments, the treatment solution can comprise less than all of the noted components, with the entirety of the treatment composition provided upon combination of the treatment solution with the tobacco material The complexing agent is generally a metal ion (e.g., provided by a metal salt), such as, for example, a zinc salt. In a preferred embodiment, the complexing agent is a zinc salt. Non-limiting examples of such zinc salts include zinc chloride, bromide, iodide, gluconate, citrate, sulfate, acetate, and the like. In a preferred embodiment, the complexing agent is zinc chloride. The complexing agent may also be a salt of a metal other than zinc, such as copper, iron, and the like. Non-limiting examples of such copper salts include cuprous or cupric chloride, bromide, iodide, gluconate, citrate, sulfate, acetate and the like. Non-limiting examples of such iron salts include ferrous or ferric chloride, bromide, iodide, gluconate, citrate, sulfate, acetate, and the like. In some embodiments, a combination of metal salts can be used. In some embodiments, the complexing agent is naturally present in the tobacco material (e.g., a chelated copper or zinc salt) in sufficient concentration that no further addition of complexing agent is necessary to promote a denitrosation reaction.

While not wishing to be bound by theory, it is believed that the inclusion of a complexing agent such as, for example, zinc chloride, assists in activating the nitrosyl group of the TSNA for departure by complexation of the corresponding metal ion to the nitrogen and/or oxygen atoms of the nitrosyl group via the available lone pair electrons. The amount of complexing agent within the treatment composition can vary and is generally that amount sufficient to facilitate denitrosation of TSNAs. In some embodiments, the complexing agent is present within the treatment composition in catalytic amounts (i.e., less than stoichiometric quantities relative to the nitrosamine to be denitrosated). In some embodiments, the complexing agent is present within the treatment composition in a concentration of about 0.1% to about 50% by dry weight, about 0.1% to about 25% by dry weight, or about 0.1% to about 15% by dry weight of the treatment composition.

The acid component of the treatment composition is provided in sufficient quantity to effectively protonate at least a portion of the nitrosamine amino nitrogen atoms as present in the TSNA molecules. Without wishing to be bound by theory, it is believed that protonation is required for the denitrosation reaction to occur. In some embodiments, at least about 50% of the TSNA molecules are protonated. In some embodiments, at least about 90% of the TSNA molecules are protonated. In some embodiments, at least about 99% of the TSNA molecules are protonated. Those skilled in the art will recognize that the amino nitrogen atoms of different TSNA molecules may have different pKa values, and therefore may require different concentrations of acid to effectively protonate at least a portion of the nitrosamine amino nitrogen atoms. Those skilled in the art will further recognize that the extent of protonation of the TSNA molecules is directly proportional to the pH of the treatment composition and will know how to select a pH capable of protonating the desired percentage of TSNA molecules given their pKa values. In some embodiments, the acidic component is present in such quantity to render an acidic treatment composition (i.e., having a pH of less than 7). In certain specific embodiments, the acidic component is added to achieve a pH value of the treatment composition of about 5.0 to about 3.0. In some embodiments, the pH of the treatment composition is about 5.0 to about 4.0. The specific acid component employed in the treatment composition can vary, and exemplary acids include, but are not limited to, hydrochloric, hydrobromic, sulfuric, phosphoric, acetic, and any combination thereof. In a preferred embodiment, the acid is hydrochloric acid.

The solvent (typically a component of both the treatment solution and treatment composition) can be any solvent sufficient to solubilize at least a portion of the TSNAs in the tobacco material and at least a portion of the additional treatment composition components (i.e., complexing agent, acid, and salt). One skilled in the art will recognize the requirements for solvent suitability, such as polarity, boiling point, ionic strength, and compatibility with reaction conditions and mechanism. In particular embodiments, the solvent comprises water. The solvent can, in some embodiments, comprise one or more additional solvents, particularly one or more additional solvents that are miscible with water. The amount of solvent included in the composition is generally that amount sufficient to solubilize at least a portion of the treatment composition components, as referenced above. In some embodiments, the solvent is present in such quantity to provide the treatment composition as a slurry or moist solid. In some embodiments, the treatment composition is between about 0.5% and about 50% by weight of solvent. In some embodiments, the solvent is present in sufficient quantity to result in a stirrable suspension. In some embodiments, the solvent is present in sufficient quantity to provide a stirrable paste.

The conditions under which the treatment solution and the tobacco material to be treated are combined, and the conditions to which the resulting treatment composition is subsequently subjected, can vary. The reaction time (i.e., time for which the treatment solution and tobacco material are in contact with one another) can vary, but is preferably an amount of time sufficient to achieve at least some reduction in TSNA amount. Preferably, the reaction time is sufficient to achieve at least a 10%, 20%, 30%, 40%, 50%, 60%, 70%, 80% or 90% or more than 90% decrease in concentration of one or more TSNAs by weight after treatment as compared with an untreated tobacco material. In some embodiments, the reaction time may be 1 minute, 10 minutes, 30 minutes, 1 hour, 8 hours, 24 hours, or more. In some embodiments, the reaction time can be at least about 10 minutes. In some particular embodiments, the reaction time can be about 10 minutes.

The treatment can be performed at varying temperatures. In some embodiments, the treatment is performed at ambient temperature. In some embodiments, the treatment composition can be subjected to heat for all or a portion of the time for which the components remain in contact (which may increase the rate of reaction, resulting in less contact time required to achieve the desired TSNA reduction). In some embodiments, the treatment composition is held at a temperature of about 20° C. to about 100° C. In some embodiments, the treatment composition is held at a temperature of about 25° C. to about 100° C. In some embodiments, the treatment composition is held at a temperature of about 20° C. to about 30° C. In some embodiments, the treatment composition is heated to a temperature of about 30° C. to about 100° C., and subsequently cooled to a temperature of about 5° C. to about 20° C. One skilled in the art will recognize that the length of time during which the treatment composition is heated can vary, and may be optimized based on multiple parameters.

In some embodiments, the treatment composition may optionally be subjected to microwave irradiation. Microwave irradiation is particularly advantageous in certain embodiments for the purpose of accelerating the denitrosation reaction by increasing molecular dipole oscillations. While not wishing to be bound by theory, it is proposed that localized heating may facilitate the denitrosation reaction while avoiding global heating of the tobacco material in contact with the treatment composition. Application of microwave heating to specific industrial-scale manufacturing, while highly limited, is recognized as commercially viable in select instances. See, for example, *C&E News*, Sep. 12, 2016, p. 24-25. Microwave irradiation may also be used as a means to provide thermal energy to the treatment composition, thereby increasing the temperature of the treatment composition. In some embodiments, the treatment composition is subjected to microwave irradiation at a power of from about 400 to about 1100 watts. In some embodiments, the treatment composition is subjected to microwave irradiation at a power of from about 400 to about 550 watts. In some embodiments, the treatment composition is subjected to microwave irradiation at a power of about 1100 watts. In some embodiments, the treatment composition is subjected to microwave irradiation for a period of at least about 1 second. In some embodiments, the treatment composition is subjected to microwave irradiation for a period of about 15 to about 30 seconds. One skilled in the art will recognize that both power and time may be varied according to scale and optimized according to known methods.

In some embodiments, the treatment is performed at atmospheric pressure (1 bar). In some embodiments, the treatment is performed under reduced or increased pressure (e.g., partial to full vacuum, or multiples of atmospheric pressure). One skilled in the art will recognize that conditions of increased or decreased pressure may be further combined with increased or decreased temperatures to promote the desired denitrosation reaction and/or suppress any undesirable reactions.

The means by which the treatment solution and tobacco material are combined to form the treatment composition can vary. In some embodiments, the treatment solution is contacted with the tobacco material by spray application. The treatment composition can be subjected to various mixing and application methods to promote homogeneity of the treatment solution, obtain uniform application of the treatment solution to the tobacco material, obtain even and thorough distribution of the treatment solution throughout the tobacco material, and enhance exposure of the tobacco material to the treatment solution. Such methods include, but are not limited to, mechanical agitation methods known to those skilled in the art, e.g., stirring, tumbling, shaking or other agitation.

Those skilled in the art will also recognize that some TSNAs may be more readily denitrosated based on structural features, and may require different reaction times, conditions and reagent concentrations to achieve desirable results. See, for example, Ohta et al, *Chem. Pharm. Bull.* 1987, 35(9), 3949-3947, which is incorporated herein by reference. Treatment of tobacco with a treatment solution according to the methods provided herein can have varying effects on the resulting treated tobacco. It is noted that the specific results obtained may be related, at least in part, to the specific moisture content and/or solvent concentration, choice and concentration of complexing agent, choice and concentration of salt, pH value, and temperature that are used in the treatment.

As noted above, the disclosed method generally comprises treating the tobacco material with the treatment solution described herein and can, in some embodiments, involve multiple such treating steps. Such treatments can, in some embodiments, comprise treating the tobacco with two or more different treatment solutions sequentially (e.g., in close succession or at significantly different time points) or simultaneously (e.g., by separately applying two or more different solutions to the tobacco or by mixing the solutions to provide a single treatment solution comprising two or more different solutes and applying the single treatment solution to the tobacco material). The tobacco material can be treated with a treatment solution (comprising, e.g., complexing agent, salt, acid and solvent) once or can be treated multiple times. In some embodiments, two treatment solutions, which may be the same or different, can be provided in separate formulations and applied at different points in processing.

Following the treating described herein above, the treatment composition may be further processed so as to provide a treated tobacco material in a particular form. Examples of such processing may include, but are not limited to, removal of one or more components of the treatment composition, neutralization of pH, grinding, extraction, etc. In certain embodiments, the treated tobacco material is removed from the treatment composition by, e.g., filtration, centrifugation or drying. In some embodiments, the separated tobacco material is washed with a solvent, such as water. In some embodiments, the separated tobacco material is dried without further processing. In some embodiments, the tobacco material is dried after separation from the treatment solution. One skilled in the art will recognize that "dried" tobacco material refers to tobacco material that contains less of the solvent (i.e., water) than tobacco material which has not been dried. However, tobacco material which has been dried may still contain some amount of solvent. As a non-limiting example, when the solvent is water, the treated and dried tobacco material may retain a portion of the water as moisture, in amounts from about 0.5% to about 50%, depending on intended use. In some embodiments, the treated tobacco material can be subjected to additional processing techniques as disclosed in further detail herein below.

Treatment with the composition disclosed herein advantageously leads to a treated tobacco material having a modified level of TSNAs (e.g., fewer TSNAs by weight than in a comparable tobacco material that has not been treated as described herein). In certain embodiments of the invention, the decrease in TSNA concentration can vary but generally, a treated, cured tobacco will comprise between about 10% and about 90% by weight of TSNAs generally as compared with the amount of TSNAs present in a comparable but untreated tobacco. For example, in certain embodiments, treated tobacco material may exhibit at least a 10%, 20%, 30%, 40%, 50%, 60%, 70%, 80%, 90%, or greater than 90% decrease in the concentration of one or more than one TSNA by weight after treatment as compared with an untreated tobacco material.

In some embodiments, the TSNA that is reduced in concentration by the disclosed method is NNN, NNK, NAT, NAB, or any combination thereof. For example, the NNN content of treated tobacco material (after being treated according to the methods disclosed herein) can, in some embodiments, be less than about 25 ppm, less than about 20 ppm, less than about 10 ppm, less than about 9 ppm, less than about 8 ppm, less than about 7 ppm, less than about 6 ppm, less than about 5 ppm, less than about 4 ppm, less than about 3 ppm, less than about 2 ppm, or less than about 1 ppm. In a preferred embodiment, the NNN content of treated tobacco material is about 3 ppm or less. In some embodiments, this NNN content represents a reduction of greater than about 10% to greater than about 90% reduction in NNN as compared with the NNN content of a tobacco material that has not been treated. In some embodiments, this NNN content represents a reduction of about 90%. In some embodiments, this NNN content represents a reduction of greater than about 75%, a reduction of greater than about 50%, a reduction greater than about 40%, a reduction greater than about 30%, a reduction greater than about 25%, a reduction greater than about 20%, or a reduction greater than about 10% of NNN content relative to the untreated tobacco material.

In some embodiments, the NNK content of treated tobacco material (after being treated according to the methods disclosed herein) can, for example, be less than about 25 ppm, less than about 20 ppm, less than about 10 ppm, less than about 9 ppm, less than about 8 ppm, less than about 7 ppm, less than about 6 ppm, less than about 5 ppm, less than about 4 ppm, less than about 3 ppm, less than about 2 ppm, or less than about 1 ppm. In a preferred embodiment, the NNK content of treated tobacco material is about 3 ppm or less. In some embodiments, this NNK content represents a reduction of greater than about 10% to greater than about 90% reduction in NNK as compared with the NNK content of a tobacco material that has not been treated. In some embodiments, this NNK content represents a reduction of about 90%. In some embodiments, this NNK content represents a reduction of greater than about 75%, a reduction of greater than about 50%, a reduction greater than about 40%, a reduction greater than about 30%, a reduction greater than about 25%, a reduction greater than about 20%, or a reduction greater than about 10% of NNK content relative to the untreated tobacco material.

In some embodiments, the NAT content of treated tobacco material (after being treated according to the methods disclosed herein) can, for example, be less than about 30 ppm, less than about 20 ppm, less than about 10 ppm, less than about 9 ppm, less than about 8 ppm, less than about 7 ppm, less than about 6 ppm, less than about 5 ppm, less than about 4 ppm, less than about 3 ppm, less than about 2 ppm, or less than about 1 ppm. In a preferred embodiment, the NAT content of treated tobacco material is about 3 ppm or less. In some embodiments, this NAT content represents a reduction of greater than about 10% to greater than about 90% reduction in NAT as compared with the NAT content of a tobacco material that has not been treated. In some embodiments, this NAT content represents a reduction of about 90%. In some embodiments, this NAT content represents a reduction of greater than about 75%, a reduction of greater than about 50%, a reduction greater than about 40%, a reduction greater than about 30%, a reduction greater than about 25%, a reduction greater than about 20%, or a reduction greater than about 10% of NAT content relative to the untreated tobacco material.

In some embodiments, the NAB content of treated tobacco material (after being treated according to the methods disclosed herein) can, for example, be less than about 25 ppm, less than about 20 ppm, less than about 10 ppm, less than about 9 ppm, less than about 8 ppm, less than about 7 ppm, less than about 6 ppm, less than about 5 ppm, less than about 4 ppm, less than about 3 ppm, less than about 2 ppm, or less than about 1 ppm. In a preferred embodiment, the NAB content of treated tobacco material is about 3 ppm or less. In some embodiments, this NAB content represents a reduction of greater than about 10% to greater than about 90% reduction in NAB as compared with the NAB content of a tobacco material that has not been treated. In some embodiments, this NAB content represents a reduction of about 90%. In some embodiments, this NAB content represents a reduction of greater than about 75%, a reduction of greater than about 50%, a reduction greater than about 40%, a reduction greater than about 30%, a reduction greater than about 25%, a reduction greater than about 20%, or a reduction greater than about 10% of NAB content relative to the untreated tobacco material.

In some embodiments, the total combined content of NNN, NAT, NAB, and NNK in the cured tobacco material is advantageously low following treatment according to the present invention, for example, less than about 65 ppm, less than about 55 ppm, less than about 50 ppm, less than about 40 ppm, less than about 30 ppm, less than about 20 ppm, or less than about 10 ppm. The combined NNN and NAT content can, in some embodiments, be less than about 1 ppm. In some embodiments, this combined content of NNN, NAT, NAB, and NNK in the treated tobacco material represents a reduction of greater than about 10% to greater than about 90% reduction in the combined TSNA content as compared with the combined TSNA content of a tobacco material that has not been treated. In some embodiments, this combined TSNA content represents a reduction of about 90%. In some embodiments, this combined TSNAB content represents a reduction of greater than about 75%, a reduction of greater than about 50%, a reduction greater than about 40%, a reduction greater than about 30%, a reduction greater than about 25%, a reduction greater than about 20%, or a reduction greater than about 10% in combined TSNA content as compared with the combined TSNA content of a tobacco material that has not been treated.

Tobacco or tobaccos to which the methods provided herein are applicable can vary. In certain embodiments, tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Pasado, Cubano, Jatim and Bezuki tobaccos), light air cured (e.g., North Wis. and *Galpao* tobaccos), Indian air cured, Red Russian and *Rustica* tobaccos, as well as various other rare or specialty tobaccos and various blends of any of the foregoing tobaccos. Descriptions of various types of tobaccos, growing practices and harvesting practices are set forth in *Tobacco Production, Chemistry and Technology*, Davis et al. (Eds.) (1999), which is incorporated herein by reference. Various representative other types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al. and U.S. Pat. No. 7,025,066 to Lawson et al.; US Patent Appl. Pub. Nos.

2006/0037623 to Lawrence, Jr. and 2008/0245377 to Marshall et al.; each of which is incorporated herein by reference. Exemplary *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N. x sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis* subsp. *Hersperis, N. pauciflora, N. petunioides, N. quadrivalvis, N. repanda, N. rotundifolia, N. solanifolia,* and *N. spegazzinii.*

*Nicotiana* species can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and PCT WO 2008/103935 to Nielsen et al. See, also, the types of tobaccos that are set forth in U.S. Pat. No. 4,660,577 to Sensabaugh, Jr. et al.; U.S. Pat. No. 5,387,416 to White et al.; and U.S. Pat. No. 6,730,832 to Dominguez et al., each of which is incorporated herein by reference.

Most preferably, the tobacco materials are those that have been appropriately cured and aged. Examples of methods for curing and/or aging tobacco are discussed, for example, in U.S. Pat. No. 1,327,692 to Beinhart; U.S. Pat. No. 2,758,603 to Heljo; U.S. Pat. No. 5,676,164 to Martin; U.S. Pat. No. 6,755,200 to Hempfling et al.; U.S. Pat. No. 7,293,564 to Perfetti et al., and U.S. Pat. No. 8,353,300 to Li et al.; and US Pat. Appl. Pub. Nos. 2010/0116281 and 2012/0279510 to Marshall et al., which are incorporated herein by reference in their entireties. Descriptions of further types of curing and aging processes for various types of tobacco are provided in Tobacco Production, Chemistry and Technology, Davis et al. (Eds.) (1999), which is also incorporated herein by reference.

For example, tobacco can be cured by methods including but not limited to, air-curing, dark air curing, sun-curing, fire curing, and flue curing. Flue curing comprises curing tobacco in enclosures wherein flues heat cure the tobacco without exposing it to smoke and is described, for example, in Nestor et al. *Beitrage Tabakforsch. Int.*, 2003, 20, 467-475 and U.S. Pat. No. 6,895,974 to Peele, which are both incorporated herein by reference. Fire cured tobacco generally comprises curing tobacco in enclosures wherein it is exposed to the gaseous combustion products of a fire that is maintained at a low smolder and is described, for example, in US Pat. Appl. Publ. 2012/0125354 to Byrd et al., which is incorporated herein by reference. Air curing typically comprises hanging tobacco in a well-ventilated enclosure to dry at ambient conditions and is described, for example, in deRoton, C. et al. *Beitrage Tabakforsch. Int.* 2005, 21, 6, 305-320; Staaf, M. et al. *Beitrage Tabakforsch Int.* 2005, 21, 6, 321-330; and U.S. Pat. No. 6,834,654 to Williams, which are incorporated herein by reference. Sun curing generally comprises allowing tobacco to cure uncovered in the sun.

Especially preferred techniques and conditions for curing flue-cured tobacco are set forth in Nestor et al., *Beitrage Tabakforsch. Int.*, 20 (2003) 467-475 and U.S. Pat. No. 6,895,974 to Peele, which are incorporated herein by reference. Representative techniques and conditions for air curing tobacco are set forth in Roton et al., *Beitrage Tabakforsch. Int.*, 21 (2005) 305-320 and Staaf et al., *Beitrage Tabakforsch. Int.*, 21 (2005) 321-330, which are incorporated herein by reference. Certain types of unusual or rare tobaccos can be sun cured. Manners and methods for improving the smoking quality of Oriental tobaccos are set forth in U.S. Pat. No. 7,025,066 to Lawson et al., which is incorporated herein by reference. Representative Oriental tobaccos include katerini, prelip, komotini, xanthi and yambol tobaccos. Tobacco compositions including dark air cured tobacco are set forth in US Patent Appl. Pub. No. 2008/0245377 to Marshall et al., which is incorporated herein by reference. See also, types of tobacco as set forth, for example, in US Patent Appl. Pub. No. 2011/0247640 to Beeson et al., which is incorporated herein by reference.

The *Nicotiana* species can be selected for the content of various compounds that are present therein. For example, in certain embodiments, plants of the *Nicotiana* species (e.g., *Galpao commun* tobacco) are specifically grown for their abundance of leaf surface compounds. In certain embodiments, plants of the *Nicotiana* species are specifically grown for their relatively low levels of certain undesired compounds (e.g., asparagine). Tobacco plants can be grown in greenhouses, growth chambers, or outdoors in fields, or grown hydroponically.

The whole tobacco plant, or certain parts or portions of the plant of the *Nicotiana* species can be processed as provided herein. For example, virtually all of the plant (e.g., the whole plant) can be processed or parts or pieces of the plant can be harvested or separated for treatment after harvest. For example, the flower, leaves, stem, stalk, roots, seeds, and various combinations thereof, can be isolated for further treatment according to the disclosed methods. Consequently, whole tobacco plants or separated portions thereof can be directly treated to reduce TSNA content, subjected to extraction techniques to provide tobacco-derived materials (e.g., extracts) that can be treated to reduce TSNA content, or used in the production of tobacco products (e.g., snuff) that can be treated to reduce TSNA content. In certain embodiments, leaves are advantageously separated from the remainder of the plant and treated according to the disclosed methods, with or without the stems.

The post-harvest processing of the plant or portion thereof can vary. After harvest, a plant, or portion thereof, can be directly used in a green form (e.g., the plant or portion thereof can be used without being subjected to any curing process). For example, the plant or portion thereof can be treated according to the disclosed methods without being subjected to significant storage, handling or processing conditions. In certain situations, it is advantageous for the plant or portion thereof be treated virtually immediately after harvest.

The TSNA reduction techniques described herein can optionally be combined with one or more processing methods including, but not limited to, freeze drying, subjecting the plant material or portions thereof to irradiation, yellowing, drying, curing (e.g., using air drying techniques or techniques that employ application of heat), heating, or cooking (e.g., roasting, frying or boiling) the plant or portion thereof, or otherwise subjecting the plant or portion thereof to storage or treatment for later use. Further processing can be conducted on any of the materials described herein, e.g., irradiation, pasteurization, or other exposure to controlled heat treatment, detailed, for example, in U.S. Pat. No. 8,061,362 to Mua et al., which is incorporated herein by reference.

A harvested plant or portion thereof can be physically processed prior to treatment as disclosed herein, before or after curing. In some embodiments, the plant or portion thereof can be separated into individual parts or pieces (e.g., the leaves can be removed from the stems, and/or the stems and leaves can be removed from the stalk) prior to treatment to reduce TSNA content. The harvested plant or individual parts or pieces can be further subdivided into parts or pieces (e.g., the leaves can be shredded, cut, comminuted, pulverized, milled or ground into pieces or parts that can be characterized as filler-type pieces, granules, particulates or fine powders). In certain embodiments, the tobacco material can have the form of processed tobacco parts in essentially natural lamina and/or stem form. The manner by which the tobacco is provided in such forms can vary. The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent. Tobacco parts or pieces can be comminuted, ground or pulverized into a powder type of form using equipment and techniques for grinding, milling, or the like. Most preferably, the tobacco is relatively dry in form during grinding or milling, using equipment such as hammer mills, cutter heads, air control mills, or the like. For example, tobacco parts or pieces may be ground or milled when the moisture content thereof is less than about 15 weight percent to less than about 5 weight percent.

The tobacco material can have the form of processed tobacco parts or pieces, cured and aged tobacco in essentially natural lamina and/or stem form, a tobacco extract, extracted tobacco pulp (e.g., using water as a solvent), or a mixture of the foregoing (e.g., a mixture that combines extracted tobacco pulp with granulated cured and aged natural tobacco lamina). Tobacco that is incorporated within tobacco products most preferably includes tobacco lamina, or a tobacco lamina and stem mixture and thus, in some embodiments, treated tobacco materials comprise such components. Treated tobacco material can be used alone or in combination with other (untreated) tobacco materials in tobacco products. Portions of the tobaccos within the tobacco product may have processed forms, such as processed tobacco stems (e.g., cut-rolled stems, cut-rolled-expanded stems or cut-puffed stems), or volume expanded tobacco (e.g., puffed tobacco, such as dry ice expanded tobacco (DIET)). See, for example, the tobacco expansion processes set forth in U.S. Pat. No. 4,340,073 to de la Burde et al.; U.S. Pat. No. 5,259,403 to Guy et al.; and U.S. Pat. No. 5,908,032 to Poindexter, et al.; and U.S. Pat. No. 7,556,047 to Poindexter, et al., all of which are incorporated by reference. In addition, the tobacco product optionally may incorporate tobacco that has been fermented. See, also, the types of tobacco processing techniques set forth in PCT WO 05/063060 to Atchley et al., which is incorporated herein by reference.

Tobacco compositions intended to be used in a smokable or smokeless form may incorporate a single type of tobacco (e.g., in a so-called "straight grade" form). For example, the tobacco within a tobacco composition may be composed solely of flue-cured tobacco (e.g., all of the tobacco may be composed, or derived from, either flue-cured tobacco lamina or a mixture of flue-cured tobacco lamina and flue-cured tobacco stem. The tobacco within a tobacco composition also may have a so-called "blended" form. For example, the tobacco within a tobacco composition of the present invention may include a mixture of parts or pieces of flue-cured, burley (e.g., Malawi burley tobacco) and Oriental tobaccos (e.g., as tobacco composed of, or derived from, tobacco lamina, or a mixture of tobacco lamina and tobacco stem). For example, a representative blend may incorporate about 30 to about 70 parts burley tobacco (e.g., lamina, or lamina and stem), and about 30 to about 70 parts flue cured tobacco (e.g., stem, lamina, or lamina and stem) on a dry weight basis. Other exemplary tobacco blends incorporate about 75 parts flue-cured tobacco, about 15 parts burley tobacco, and about 10 parts Oriental tobacco; or about 65 parts flue-cured tobacco, about 25 parts burley tobacco, and about 10 parts Oriental tobacco; or about 65 parts flue-cured tobacco, about 10 parts burley tobacco, and about 25 parts Oriental tobacco; on a dry weight basis. Other exemplary tobacco blends incorporate about 20 to about 30 parts Oriental tobacco and about 70 to about 80 parts flue-cured tobacco Tobacco (in any of the forms described herein, including but not limited to, green form, dehydrated form, cured form, treated, etc.) can, in certain embodiments, be subsequently extracted. Various extraction techniques can be used. See, for example, the extraction processes described in U.S. Pat. No. 9,039,839 to Beeson et al., which is incorporated herein by reference. Other exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and U.S. Pat. No. 7,337,782 to Thompson, all of which are incorporated by reference herein.

The tobacco materials discussed in the present disclosure can further be treated and/or processed in other ways before, during, or after the treatment to reduce TSNAs as described herein. For example, if desired, the tobacco materials can be irradiated, pasteurized, or otherwise subjected to controlled heat treatment. Such treatment processes are detailed, for example, in U.S. Pat. No. 8,061,362 to Mua et al., which is incorporated herein by reference.

In certain embodiments, treated tobacco materials as described herein can be further contacted with water and an additive capable of inhibiting reaction of asparagine to form acrylamide upon heating of the tobacco material (e.g., an additive selected from the group consisting of lysine, glycine, histidine, alanine, methionine, glutamic acid, aspartic acid, proline, phenylalanine, valine, arginine, compositions incorporating di- and trivalent cations, asparaginase, certain non-reducing saccharides, certain reducing agents, phenolic compounds, certain compounds having at least one free thiol group or functionality, oxidizing agents, oxidation catalysts, natural plant extracts (e.g., rosemary extract), and combinations thereof), and combinations thereof. See, for example, the types of treatment processes described in US Pat. Pub. Nos. 2010/0300463; 2011/0048434; and 2012/0060854, all to Chen et al., which are all incorporated herein by reference. In certain embodiments, this type of treatment is useful where the original tobacco material is subjected to heat in the extraction and/or distillation process previously described.

Figure 2:
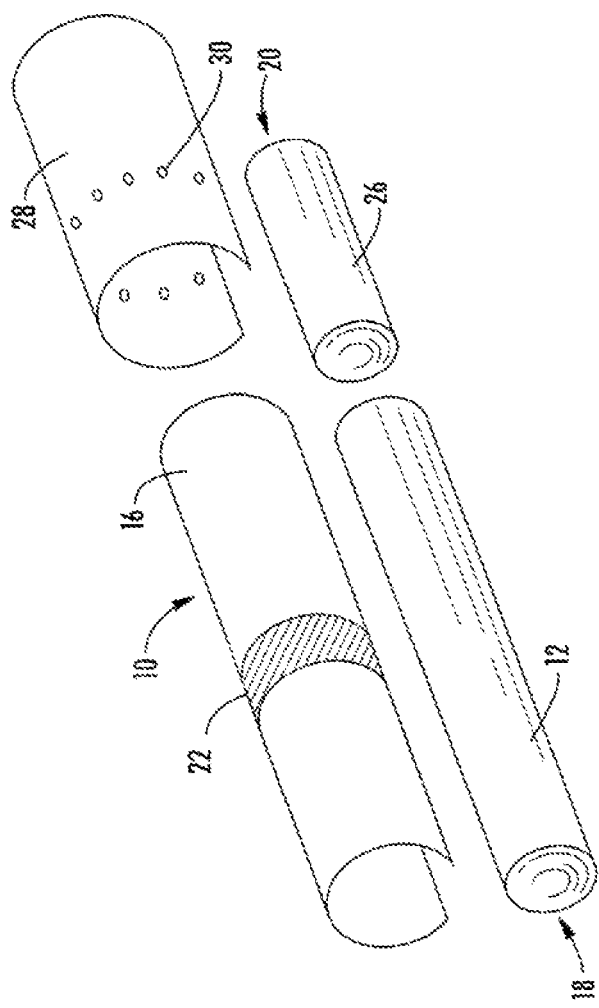
FIG. 2 is an exploded perspective view of a smoking article having the form of a cigarette, showing the smokable material, the wrapping material components, and the filter element of the cigarette.
Figure 3:
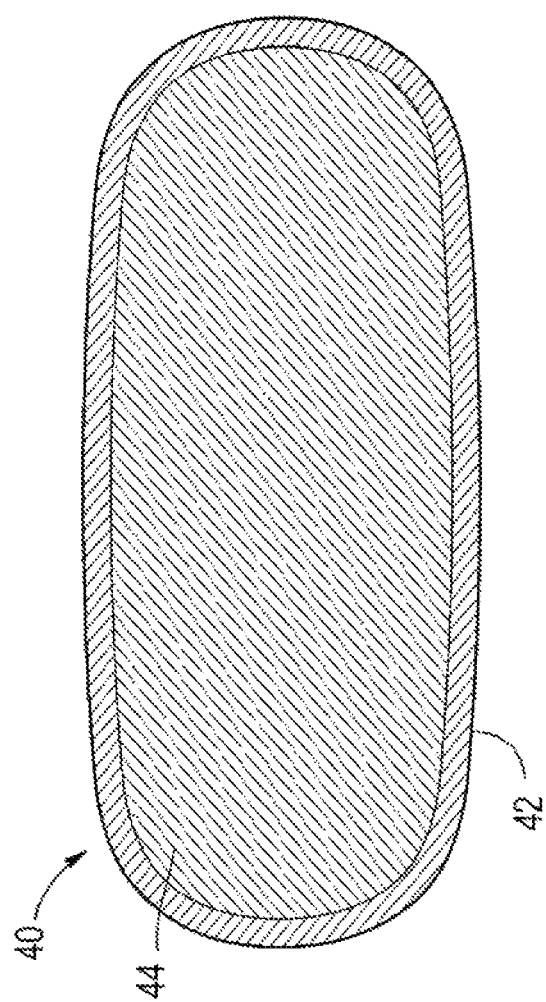
FIG. 3 is a cross-sectional view of a smokeless tobacco product embodiment, taken across the width of the product, showing an outer pouch filled with a smokeless tobacco composition of the invention.

Referring to FIG. 2, there is shown a smoking article 10 in the form of a cigarette and possessing certain representative components of a smoking article that can contain tobacco that has been treated according to the methods disclosed herein (i.e., tobacco having a lower TSNA content than found in tobacco that has not been treated according to these methods). The cigarette 10 includes a generally cylindrical rod 12 of a charge or roll of smokable filler material (e.g., about 0.3 to about 1.0 g of smokable filler material such as tobacco material) contained in a circumscribing wrapping material 16. The rod 12 is conventionally referred to as a "tobacco rod." The ends of the tobacco rod 12 are open to expose the smokable filler material. Typically, at least a portion of the smokable filler material comprises tobacco treated according to the methods outlined herein (i.e., tobacco having a lower TSNA content than found in tobacco that has not been treated according to these methods). In some embodiments, 100% of the tobacco in the tobacco rod consists of treated tobacco material (i.e., tobacco material with a lower TSNA content, as provided by the methods disclosed herein). In other embodiments, less than 100% of the tobacco rod consists of tobacco of such treated tobacco, such as about 98%, about 95%, about 90%, about 85%, about 80%, about 75%, about 70%, about 60%, about 50%, about 40%, about 30%, about 20%, about 10%, or less than about 10% treated tobacco.

The cigarette 10 is shown as having one optional band 22 (e.g., a printed coating including a film-forming agent, such as starch, ethylcellulose, or sodium alginate) applied to the wrapping material 16, and that band circumscribes the cigarette rod in a direction transverse to the longitudinal axis of the cigarette. The band 22 can be printed on the inner surface of the wrapping material (et al, facing the smokable filler material), or less preferably, on the outer surface of the wrapping material.

At one end of the tobacco rod 12 is the lighting end 18, and at the mouth end 20 is positioned a filter element 26. The filter element 26 is positioned adjacent to one end of the tobacco rod 12 such that the filter element and tobacco rod are axially aligned in an end-to-end relationship, preferably abutting one another. Filter element 26 may have a generally cylindrical shape, and the diameter thereof may be essentially equal to the diameter of the tobacco rod. The ends of the filter element 26 permit the passage of air and smoke therethrough.

A ventilated or air diluted smoking article can be provided with an optional air dilution means, such as a series of perforations 30, each of which extend through the tipping material and plug wrap. The optional perforations 30 can be made by various techniques known to those of ordinary skill in the art, such as laser perforation techniques. Alternatively, so-called off-line air dilution techniques can be used (e.g., through the use of porous paper plug wrap and pre-perforated tipping paper).

Tobacco materials with reduced TSNA concentration, prepared according to the present disclosure can also be incorporated into aerosol-generating devices that contain nicotine and/or tobacco material (or some portion or component thereof) that is not intended to be combusted during use, including so-called "e-cigarettes." Some of these types of smoking articles employ a combustible fuel source that is burned to provide an aerosol and/or to heat an aerosol-forming material. Others employ battery-powered heating elements to heat an aerosol-forming composition. Exemplary references that describe smoking articles of a type that generate flavored vapor, visible aerosol, or a mixture of flavored vapor and visible aerosol, include those set forth in U.S. Pat. No. 9,107,453 to Dube et al., which is incorporated by reference herein.

The treated tobacco material with reduced TSNA concentration, prepared according to the disclosed method, can be incorporated into smokeless tobacco products, such as loose moist snuff; snus; loose dry snuff; chewing tobacco; pelletized tobacco pieces; extruded or formed tobacco strips, pieces, rods, cylinders or sticks; finely divided ground powders; finely divided or milled agglomerates of powdered pieces and components; flake-like pieces; molded tobacco pieces; gums; rolls of tape-like films; readily water-dissolvable or water-dispersible films or strips; meltable compositions; lozenges; pastilles; or capsule-like materials possessing an outer shell and an inner region. Smokeless tobacco compositions of the invention can include a water-soluble polymeric binder material and optionally other ingredients that provide a dissolvable composition that will slowly disintegrate in the oral cavity during use. In certain embodiments, the smokeless tobacco composition can include lipid components that provide a meltable composition that melts (as opposed to merely dissolving) in the oral cavity, such as compositions set forth in US Pat. Pub. No. 2012/0037175 to Cantrell et al., which is incorporated by reference herein. Various types of smokeless tobacco products are described or referenced in US Pat. Pub. No 2012/0152265 to Dube et al., which is incorporated herein by reference.

Any of the components of the above-recited tobacco products can comprise tobacco material with reduced TSNA content (treated in the manner described) such that at least a portion of the tobacco material contained therein comprises the treated tobacco material. In some embodiments, the tobacco in the tobacco product consists of (or consists essentially of treated tobacco (i.e., 100% of the tobacco material in the product is treated tobacco material). In other embodiments, less than 100% of the tobacco material in the tobacco product consists of treated tobacco, such as less than about 98%, about 95%, about 90%, about 85%, about 80%, about 75%, about 70%, about 60%, about 50%, about 40%, about 30%, about 20%, about 10%, or less than about 10% by weight treated tobacco material, based on the entirety of tobacco material within the product. In some embodiments, a smoking article produced according to the methods provided herein, upon smoking, is characterized by a TSNA content of mainstream smoke that is reduced relative to an untreated control smoking article.

Further ingredients can be admixed with, or otherwise incorporated within, smokeless tobacco compositions according to the invention (which comprise treated tobacco material). The ingredients can be artificial, or can be obtained or derived from herbal or biological sources. Exemplary types of ingredients include salts (e.g., sodium chloride, potassium chloride, sodium citrate, potassium citrate, sodium acetate, potassium acetate, and the like), natural sweeteners (e.g., fructose, sucrose, glucose, maltose, vanillin, ethylvanillin glucoside, mannose, galactose, lactose, and the like), artificial sweeteners (e.g., sucralose, saccharin, aspartame, acesulfame K, neotame and the like), organic and inorganic fillers (e.g., grains, processed grains, puffed grains, maltodextrin, dextrose, calcium carbonate, calcium phosphate, corn starch, lactose, mannitol, xylitol, sorbitol, finely divided cellulose, and the like), binders (e.g., povidone, sodium carboxymethylcellulose and other modified cellulosic types of binders, sodium alginate, xanthan gum, starch-based binders, gum arabic, lecithin, and the like), pH adjusters or buffering agents (e.g., metal hydroxides, preferably alkali metal hydroxides such as sodium hydroxide and potassium hydroxide, and other alkali metal buffers such as metal carbonates, preferably potassium carbonate or sodium carbonate, or metal bicarbonates such as sodium bicarbonate, and the like), colorants (e.g., dyes and pigments, including caramel coloring and titanium dioxide, and the like), humectants (e.g., glycerin, propylene glycol, and the like), effervescing materials such as certain acid/base combinations, oral care additives (e.g., thyme oil, eucalyptus oil, and zinc), preservatives (e.g., potassium sorbate, and the like), syrups (e.g., honey, high fructose corn syrup, and the like), disintegration aids (e.g., microcrystalline cellulose, croscarmellose sodium, crospovidone, sodium starch glycolate, pregelatinized corn starch, and the like), flavorant and flavoring mixtures, antioxidants, and mixtures thereof. Exemplary encapsulated additives are described, for example, in WO 2010/132444 to Atchley, which has been previously incorporated by reference herein. See also, the smokeless tobacco ingredients set forth in US Pat. Pub. Nos. 2012/0055494 to Hunt et al. and 2012/0199145 to Byrd et al., which are incorporated by reference herein.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

General Experimental

LC-MS/MS System and Conditions

The liquid chromatographic system was equipped with an autosampler, binary pump and column oven. For detection, a triple quadrupole mass spectrometer with an electrospray ionization (ESI) source was employed. The ESI was run in positive mode. Quantitation was performed according to known methods using appropriate standards. The column used was a Waters Xterra MS C18 (2.1×50 mm, 2.5 µm particle size). The column was protected with a Waters Xterra MS C18 guard column (2.1×10 mm, 3.5 µm particle size). Column temperature was 60° C. Flow rate was 0.22 ml/min. Gradient elution was performed using water as Mobile Phase A and 0.1% (v/v) acetic acid in methanol as Mobile Phase B. The gradient was as follows: 100% A to 10% A over 3 minutes; hold for 1 minute; 10% to 0% A over 1 minute; 0% to 100% A over 1 minute; hold for 4 minutes.

Internal Standard

An internal standard solution containing 2000 ng/ml of each of NNN-d4, NNK-d4, NAT-d4 and NAB-d4 was prepared in acetonitrile.

Sample Preparation

An approximately 1 g sample of the treatment composition was weighed and transferred to a 100 mL flask. To the flask was added the internal standard solution (0.3 ml) and 30 ml of 100 mM ammonium acetate. The mixture was agitated on an orbital shaker for 45 minutes at 130 RPM. The resulting extract was filtered through a 25 mm diameter, 0.45 µM PTFE syringe filter into an amber vial. Injection volume was 10 µL.

Example 1 (Control)

A solution of 1N HCl (75 ml; 2.65 oz.) and water (4.5 oz.) was prepared and sprayed onto 11.49 ounces of fine cut tobacco blend at 9.5% water content, and the resulting sample mixed in a commercial mixer with a paddle attachment for 10 minutes. After addition of the treatment solution to the tobacco, the pH of the tobacco treatment composition was 5.2 and the moisture (oven volatiles) was 33.85%. This sample served as the control. The composition was packaged in a plastic can with a plastic lid. A label was applied to the side of the can and lid as a seal. The sample was maintained at ambient temperature prior to analysis. A sample of the mixture was analyzed for nitrosamine content by liquid chromatography with tandem mass spectrometry (LC-MS/MS). TSNAs (dry basis and as is) are provided in Tables 1-3, below.

Example 2

A solution of 1N HCl (5.3 oz.), zinc chloride (ZnCl$_2$; 0.48 oz.) and water (3.8 oz.) was prepared and sprayed onto 22.45 ounces of fine cut tobacco blend at 9.5% water content, and the resulting sample mixed in a commercial mixer with a paddle attachment for 10 minutes. After addition of the treatment solution to the tobacco blend, the pH of the tobacco treatment composition was 5.2 and the moisture (oven volatiles) was 33.23%. The composition was packaged in a plastic can with plastic lid. A label was applied to the side of the can and lid as a seal. The sample was maintained at ambient temperature prior to analysis. A sample was analyzed for nitrosamine content as in Example 1; results are provided in Tables 1 and 2, below.

Example 3

A solution of 1N HCl (5.3 oz.), zinc chloride (0.48 oz.), potassium iodide (0.048 oz.) and water (3.8 oz.) was prepared and sprayed onto 22.40 ounces of fine cut tobacco blend at 9.5% water content, and the resulting sample mixed in a commercial mixer with a paddle attachment for 10 minutes. After addition of the treatment solution to the tobacco blend, the pH of the tobacco treatment composition was 5.2 and the moisture (oven volatiles) was 33.90%. The composition was packaged in a plastic can with plastic lid. A label was applied to the side of the can and lid as a seal. The sample was maintained at ambient temperature prior to analysis. A sample was analyzed for nitrosamine content as in Example 1; results are provided in Tables 1 and 2, below.

Example 4

A solution of 1N HCl (5.4 oz.), zinc chloride (0.48 oz.) and water (10.33 oz.) was prepared and sprayed onto 22.45 ounces of fine cut tobacco blend at 9.5% water content, and the resulting sample mixed in a commercial mixer with a paddle attachment for 10 minutes. After addition of the treatment solution to the tobacco blend, the pH of the tobacco treatment composition was 5.2 and the moisture (oven volatiles) was 52.76%. The composition was packaged in a plastic can with plastic lid. A label was applied to the side of the can and lid as a seal. The sample was maintained at ambient temperature prior to analysis. A sample was analyzed for nitrosamine content as in Example 1; results are provided in Tables 1 and 2, below.

Example 5

A solution of 1N HCl (5.4 oz.), zinc chloride (0.48 oz.), potassium iodide (0.048 oz.) and water (10.28 oz.) was prepared and sprayed onto 15.68 ounces of fine cut tobacco blend at 9.5% water content, and the resulting sample mixed in a commercial mixer with a paddle attachment for 10 minutes. After addition of the treatment solution to the tobacco blend, the pH of the tobacco treatment composition was 5.2 and the moisture (oven volatiles) was 52.11%. The composition was packaged in a plastic can with plastic lid. A label was applied to the side of the can and lid as a seal. The sample was maintained at ambient temperature prior to analysis. A sample was analyzed for nitrosamine content as in Example 1; results are provided in Tables 1 and 2, below.

Table 1 provides the nitrosamine content as total TSNAs, NNN, NAT, NAB and NNK in the tobacco material after treatment, on a dry weight basis after treatment. Example 1 represents the control (no complexing agent or salt added), while Examples 2-5 indicate the results under different moisture contents, and with/without potassium iodide present. The largest reduction of nitrosamines occurred in the presence of $ZnCl_2$ alone; the lower moisture content of the compositions in Examples 2 and 3 provided superior results.

TABLE 1

Nitrosamine content of treated tobacco, dry basis.

| Example # | Composition | % Moisture | NNN (Dry Basis) ppm | NAT (Dry Basis) ppm | NAB (Dry Basis) ppm | NNK (Dry Basis) ppm | Total TSNA (Dry Basis) ppm |
|---|---|---|---|---|---|---|---|
| 1 | Control | 33.85 | 21.75 | 33.82 | 1.83 | 6.71 | 64.11 |
| 2 | +$ZnCl_2$ | 33.23 | 18.82 | 29.14 | 1.73 | 6.27 | 55.96 |
| 3 | +$ZnCl_2$, +KI | 33.90 | 19.20 | 33.31 | 1.65 | 5.79 | 59.95 |
| 4 | +$ZnCl_2$ | 52.76 | 21.45 | 31.39 | 1.63 | 6.19 | 60.66 |
| 5 | +$ZnCl_2$, +KI | 52.11 | 17.84 | 35.16 | 1.74 | 6.15 | 60.89 |

Table 2 provides the percent reduction of individual and total TSNAs for the treated tobaccos on a dry weight basis. The greatest reduction (11.42%) was observed for NNN at 33.85% moisture content in the presence of $ZnCl_2$ alone.

TABLE 2

Percent reduction of nitrosamines in treated tobacco, dry basis; adjusted for post-treatment solids content.

| Example # | Composition | NNN (Dry) % Reduction | NAT (Dry) % Reduction | NAB (Dry) % Reduction | NNK (Dry) % Reduction | Total TSNA (Dry) % Reduction |
|---|---|---|---|---|---|---|
| 1 | Control | NA | NA | NA | NA | NA |
| 2 | +$ZnCl_2$ | 11.42% | 11.80% | 3.18% | 4.39% | 10.65% |
| 3 | +$ZnCl_2$, KI | 7.09% | −3.60% | 5.38% | 9.24% | 1.62% |
| 4 | +$ZnCl_2$ | 8.71% | −1.79% | 7.03% | 10.83% | 3.34% |
| 5 | +$ZnCl_2$, KI | 8.40% | −2.14% | 6.71% | 10.52% | 3.02% |

Example 6

The procedure of Example 2 was performed, but the quantity of 1N HCl was reduced to a volume sufficient to provide a pH of the treatment composition of 6.0. No reduction in concentration of TSNAs was observed. This is presumably due to an insufficient extent of protonation of the TSNAs at pH 6.0 as opposed to the previous examples performed at pH 5.2.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. Although specific terms are employed herein, they are used in a generic and descriptive sense only and not for purposes of limitation. All patents and publications cited herein are incorporated by reference herein for the specific teachings thereof as noted, unless other specific statements of incorporation are specifically provided.

What is claimed is:

1. A method for reducing the content of nitrosamines in tobacco, said method comprising:

contacting a tobacco material having an initial tobacco-specific nitrosamine (TSNA) content with a treatment solution to obtain a treatment composition;

wherein said tobacco material is in a form of processed tobacco parts or pieces, or is a cured and aged tobacco;

wherein the treatment composition comprises, in addition to the tobacco material, an acid selected from the group consisting of hydrochloric acid, sulfuric acid, phosphoric acid, acetic acid, and combinations thereof, a complexing agent present at a concentration from about 1% to about 6.5% by weight of the treatment composition on a dry weight basis, the complexing agent selected from the group consisting of a zinc salt, a copper salt, an iron salt, and combinations thereof, and water in an amount from about 20% to about 60% by weight; and wherein the pH of the treatment composition is about 5.5 or less;

to provide a treated tobacco material having a TSNA content that is lower than the initial TSNA content.

2. The method of claim 1, wherein the treatment composition comprises from about 30% to about 55% water by weight.

3. The method of claim 1, wherein the pH of the treatment composition is from about 5.5 to about 3.0.

4. The method of claim 1, wherein the complexing agent is zinc chloride.

5. The method of claim 4, wherein the zinc chloride is present in the treated tobacco material at a concentration of less than about 2.5% by weight on a dry weight basis.

6. The method of claim 1, wherein the treatment composition further comprises a salt of a Group I or II metal.

7. The method of claim of 6, wherein the salt is selected from the group consisting of sodium chloride, sodium bromide, sodium iodide, potassium chloride, potassium bromide, potassium iodide, calcium chloride, calcium bromide, magnesium chloride, magnesium bromide, ammonium chloride, and combinations thereof.

8. The method of claim 6, wherein the salt is present in the treatment composition at a concentration of from about 1% to about 8% by weight on a dry weight basis.

9. The method of claim 1, wherein the acid is hydrochloric acid.

10. The method of claim 1, wherein the initial tobacco-specific nitrosamine content of one or more of NNN, NAT, NAB, NNK, or total TSNA is from about 1 ppm to about 100 ppm on a dry basis.

11. The method of claim 1, wherein the treated tobacco material tobacco-specific nitrosamine content of one or more of NNN, NAT, NAB, NNK, or total TSNA is less than about 5 ppm on a dry basis.

12. The method of claim 1, wherein said method provides a reduction in one or more of NNN, NAT, NAB, NNK, or total TSNA content of from about 2% to about 99%.

13. The method of claim 1, further comprising subjecting the treatment composition to microwave irradiation.

14. A tobacco material having a reduced TSNA content produced by the method of claim 1.

* * * * *